3,355,404
STYRENE POLYMERS CONTAINING BEHENIC ACID AS A LUBRICANT
Norman R. Ruffing and Floyd B. Nagle, Midland, and Winfield S. Haynes, Jr., Freeland, Mich., assignors to The Dow Chemical Company, Midland, Mich., a corporation of Delaware
No Drawing. Filed Jan. 25, 1965, Ser. No. 427,962
6 Claims. (Cl. 260—23)

ABSTRACT OF THE DISCLOSURE

Compositions comprising a normally solid thermoplastic styrene polymer having intimately incorporated throughout from 0.01 to 2 percent by weight of a saturated aliphatic monocarboxylic acid consisting of at least 75 percent by weight of an acid having from 22 to 25 carbon atoms in the molecule.

This invention concerns styrene polymers containing behenic acid and relates to a method of making the compositions. It relates more particularly to molding compositions consisting essentially of resinous thermoplastic styrene polymers having a small amount of behenic acid intimately and uniformly incorporated throughout.

It is known to employ stearic acid or salts of stearic acid, e.g. zinc stearate, calcium stearate, magnesium stearate, or aluminum stearate, as mold release agents, anti-blocking agents or as anti-clumping or anti-agglomerating agents in the manufacture and processing of thermoplastic polymers. U.S. Patent No. 2,675,362 describes a process for making polystyrene which comprises dissolving a saturated aliphatic acid containing from 12 to 20 carbon atoms in styrene monomer and thereafter heating the solution in mass to form a solid polymer containing the stearic acid uniformly distributed throughout.

It has now been discovered that saturated aliphatic monocarboxylic acids containing from 22 to 25 carbon atoms in the molecule, and particularly behenic acid, $CH_3 \cdot (CH_2)_{20} \cdot CO_2H$, can readily be incorporated with styrene polymers, either by a mass polymerization technique, or by heat-plastifying the polymer in admixture with the aliphatic acid and mechanically working or compounding the ingredients into a uniform composition at the elevated temperatures required to soften and/or melt the ingredients, to form compositions possessing improved properties. It has further been discovered that the saturated aliphatic monocarboxylic acids containing from 22 to 25 carbon atoms in the molecule can be used in substantially lesser amounts than that required to produce a similar result, e.g. in mold release properties, than when the known aliphatic acids are employed in otherwise similar styrene polymer compositions.

The saturated aliphatic monocarboxylic acid can consist of one or a mixture of acids containing from 22 to 25 carbon atoms, or consist predominantly, e.g. of at least 75 percent by weight, of one or a mixture of acids containing a lesser number of carbon atoms in the molecule, with not more than 25 percent by weight of fatty acids containing a lesser number of carbon atoms, e.g. 18 to 20 carbon atoms. Among suitable aliphatic acids containing from 22 to 25 carbon atoms are behenic acid, tricosanoic acid, tetracosanoic acid, and pentacasanoic acid. Behenic acid or a commercial grade of behenic acid, consisting of at least 70 percent by weight or more behenic acid is preferred. The aliphatic carboxylic acid can be used in amounts of from 0.01 to 2, preferably from 0.01 to 0.08 percent by weight of the styrene polymer.

The compositions can be prepared by dissolving the saturated aliphatic monocarboxylic acid, or mixture of acids, containing from 22 to 25 carbon atoms in the styrene monomer or mixture of monomers consisting predominantly of a styrene monomer, and heating the solution at temperatures between about 80° and 240° C. to polymerize the monomer and form a normally solid styrene polymer having the aliphatic acid uniformly incorporated throughout.

Alternatively, the styrene polymer can be heat plastified, i.e. heated at elevated temperatures sufficient to render it plastic, in admixture with the aliphatic acid, in a plastic extruder, a Banbury mixer, or on compounding rolls, and at temperatures above the melting point of the aliphatic acid, and the heat-softened mixture mechanically worked and blended into a homogeneous product.

Among styrene polymers that can be employed in the invention are homopolymers and copolymers of any one, two, three, four, or more, vinylidene aromatic hydrocarbons and nuclear halogenated vinylidene aromatic hydrocarbons such as styrene, vinyltoluene, vinylxylene, ar-ethylvinylbenzene, isopropylstyrene, tert.-butylstyrene, chlorostyrene, ar-chlorovinyltoluene, copolymers of a predominant amount, e.g. 50 percent by weight or more, of any one or more of such vinylidene aromatic compounds and a minor amount (not more than 50 percent) by weight of one or more other vinyl or vinylidene monomers copolymerizable therewith such as methyl methacrylate, acrylonitrile, or alpha-methyl styrene, and rubber reinforced styrene polymers such as the copolymers of from 1 to 15 percent by weight of a rubbery homopolymer of butadiene, or a copolymer of a major proportion of butadiene and a minor amount of styrene, and from 99 to 85 percent by weight of styrene or a mixture of a predominant amount of styrene and a minor amount of methyl methacrylate, acrylonitrile, or alpha-methyl styrene.

The compositions are useful for molding plastic articles such as cups, containers, boxes, film, sheet and the like. Sheet or film can be shaped by vacuum forming to form cups, trays, food containers, and the like.

The following examples illustrate ways in which the principle of the invention has been applied but are not to be construed as limiting its scope.

EXAMPLE 1

In each of a series of experiments, a granular molding grade polystyrene having a viscosity characteristic of 39.3 centipoises as determined for a 10 weight percent solution of the polystyrene in toulene at 25° C. and which polystyrene had a Vicat softening point of 216° F., was mixed with a finely divided commercial grade behenic acid, i.e. an 80% $C_{22}$, 12% $C_{20}$, 8% $C_{17}$, aliphatic carboxylic acid, in proportions as stated in the following table. The mixture was fed to a National Rubber Machine Plastics Extruder having a one-inch diameter worm screw wherein the materials were heated, melted, pressed and mechanically worked and intimately incorporated with one another at temperatures of about 420–425° F., then was extruded as a plurality of strands and was cooled and cut to a granular form suitable for molding. Portions of the product were injection molded at a temperature of 370° F. and 600 pounds per square inch pressure using a 45 second molding cycle in a 1-ounce Watson-Stillman injection molding machine to form internally threaded screw-type bottle caps of about one inch diameter. After molding of a bottle cap, the female portion of the mold was removed leaving the molded cap adhered to the threaded male portion of the mold which was fitted with a handle. The mold bearing the cap was secured in an Owens-Illinois Spring Torque Tester. The molded cap was clamped to a lever and was twisted to release or unscrew the cap from the threaded male portion of the mold while at the same time the force in inch-pounds to initially free the molded cap from the threaded mold was observed. The inch pounds of force to release the molded bottle cap from the threads of the mold is a measure of the releasability of the molded plastic from the mold. The results are reported in Table I.

TABLE I

| Run No. | Starting Materials | | Product |
|---|---|---|---|
| | Polystyrene Parts | Behenic Acid, Percent | Torque to Release Bottle Cap, in.-lbs. |
| 1 | 100 | None | 106 |
| 2 | 100 | 0.05 | 36 |
| 3 | 100 | 0.10 | 28 |
| 4 | 100 | 0.15 | 27 |
| 5 | 100 | 0.25 | 20 |

EXAMPLE 2

Styrene containing 0.25 percent by weight of commercial grade (80% $C_{22}$, 12% $C_{20}$, 8% $C_{18}$) behenic acid was polymerized by heating the same in mass in a closed container under time and temperature conditions as follows: 2 hours at 155° C.; 1 hour to heat from 155° C. to 235° C.; and 3.75 hours at 235° C. The polylmer was cooled, was removed from the container and was ground to a granular form. Portions of the polymer were injection molded to form bottle caps and were tested to measure the mold releasability of the product employing procedure similar to that employed in Example 1. The product had a mold releasability of 24 in.-lbs.

In contrast, polystyrene containing 0.25 percent by weight of stearic acid, and prepared in a similar manner, had a mold releasability value of 43 in.-lbs.

Polystyrene containing 2.5 percent by weight of stearic acid, and prepared in a similar manner, is found to have a mold releasability value of about 24 in.-lbs.

EXAMPLE 3

In each of a series of experiments, a copolymer of styrene and acrylonitrile as hereinafter identified was heat-plastified and blended with a commercial grade (80% $C_{22}$, 12% $C_{20}$, 8% $C_{18}$) behenic acid in a plastics extruder at a temperature of about 450° F., then was extruded, was cooled and was ground to a granular form. Portions of the ground polymer were injection molded to form bottle caps and was tested for its mold releasability. Table II identifies the experiments and gives the values determined for the polymer.

TABLE II

| Run No. | Starting Materials | | | Product—Torque to Release Bottle Cap, in.-lbs. |
|---|---|---|---|---|
| | Styrene, Percent | VCN, Percent | Behenic Acid, Percent | |
| 1 | 77 | 23 | None | 150 |
| 2 | 77 | 23 | 0.25 | 55 |
| 3 | 77 | 23 | 0.50 | 45 |
| 4 | 80 | 20 | 0.75 | 54 |

EXAMPLE 4

In each of a series of experiments, polystyrene containing commercial grade behenic acid (80% $C_{22}$, 12% $C_{20}$, 8% $C_{18}$) in amount as stated in the following table was extruded as a sheet and was subjected to stretching to produce a biaxially oriented film 10 mils thick, suitable for molding by vacuum forming technique. Portions of the film were pressed by air pressure against a metal platen heated at a temperature of 270° F. for a period of about 5 seconds sufficient to heat the film throughout, then was removed from contact with the heated platen by air pressure and was placed over a mold. The releasability of the film from the heated platen was observed and recorded. Other portions of the granular polystyrene starting material containing the behenic acid were injection molded to form screw-type bottle caps and a mold releasability value determined for the product. Other molded test pieces of the polystyrene were used to determine tensile strength and elongation values by procedures similar to those described in ASTM D638–59T. Impact strength was determined by procedure similar to that described in ASTM D256–59T. The compositions and the properties determined therefor were as follows:

TABLE III

| Test No. | 1 | 2 | 3 | 4 |
|---|---|---|---|---|
| Polystyrene parts | 100 | 100 | 100 | 100 |
| Behenic Acid (80%) | None | 0.02 | 0.03 | 0.04 |
| Tensile Strength, lbs./sq. in | 5,314 | 5,679 | 5,285 | 5,226 |
| Elongation, Percent | 1.1 | 1.5 | 1.1 | 1.0 |
| Impact Strength, ft.-lbs | 0.28 | 0.29 | 0.26 | 0.31 |
| Vicat Soft. Point, ° F | 218 | 218 | 218 | 218 |
| Melt Viscosity Poise | 5,424 | 4,230 | 4,670 | 4,051 |
| Volatile, Percent | 0.60 | 0.71 | 0.69 | 0.40 |
| Solution Viscosity, Cps | 32.5 | 30.3 | 30.5 | 30.0 |
| Bottle Cap Torque Release, in.-lbs | 102 | 34 | 27 | 39.5 |

Each of the films made from the polystyrene containing behenic acid readily released from the heated platen, whereas the film made from polystyrene alone was tacky when heated and had a tendency to stick to the heated platen and tear before releasing.

We claim:
1. A composition of matter consisting essentially of a normally solid thermoplastic styrene polymer having intimately incorporated throughout from 0.01 to 2 percent by weight of a saturated aliphatic monocarboxylic acid consisting of at least 75 percent by weight of an acid having from 22 to 25 carbon atoms in the molecule.

2. A composition of matter consisting essentially of a normally solid thermoplastic styrene polymer having intimately incorporated throughout from 0.01 to 2 percent by weight of a saturated aliphatic monocarboxylic acid consisting of at least 75 percent by weight of behenic acid.

3. A composition of matter consisting essentially of polystyrene having intimately incorporated throughout from 0.01 to 2 percent by weight of a saturated aliphatic monocarboxylic acid consisting of at least 75 percent by weight of an acid having from 22 to 25 carbon atoms in the molecule.

4. A composition as claimed in claim 3 wherein the monocarboxylic acid consists of at least 75 weight percent behenic acid.

5. A composition of matter consisting essentially of a copolymer of from 70 to 80 percent by weight of styrene and from 30 to 20 percent of acrylonitrile having intimately incorporated throughout from 0.01 to 2 percent by weight of a saturated aliphatic monocarboxylic acid consisting of at least 75 percent by weight of an acid having from 22 to 25 carbon atoms in the molecule.

6. A composition as claimed in claim 5 wherein the monocarboxylic acid consists of at least 75 weight percent behenic acid.

References Cited
UNITED STATES PATENTS

| | | | |
|---|---|---|---|
| 2,485,592 | 10/1949 | Griess et al. | 260—23 |
| 2,857,341 | 10/1958 | Colwell et al. | 260—2.5 |
| 3,100,195 | 8/1963 | Zomlefer | 260—23 |
| 3,117,946 | 1/1964 | Gorham et al. | 260—23 |
| 3,222,341 | 12/1965 | Barrett et al. | 260—93.5 |

DONALD E. CZAJA, *Primary Examiner.*

R. A. WHITE, *Assistant Examiner.*